Jan. 16, 1934. H. GROB 1,943,432
ARMATURE CONSTRUCTION FOR DYNAMO ELECTRIC MACHINES
Filed Oct. 3, 1930

Hugo Grob
INVENTOR

BY Janney, Blair & Curtis
ATTORNEYS

Patented Jan. 16, 1934

1,943,432

UNITED STATES PATENT OFFICE 1,943,432

ARMATURE CONSTRUCTION FOR DYNAMO-ELECTRIC MACHINES

Hugo Grob, Berlin, Germany

Application October 3, 1930, Serial No. 486,185, and in Germany October 4, 1929

3 Claims. (Cl. 171—228)

This invention relates to direct current motor or generator construction and more particularly to the construction of the armature.

One of the objects of this invention is to provide a simple, practical and inexpensive armature construction for a direct current machine. Another object of this invention is to provide a direct current armature construction which will effectually and dependably reduce sparking, overheating and pitting of the commutator. Another object of this invention is to provide in a direct current machine operating under widely variable speeds, a simple, practical and dependable manner of reducing commutation difficulties. Another object of this invention is to provide in a direct current machine operating under various and rapidly changing loads, a manner of dependably and effectually, and with a minimum amount of attention, reducing or eliminating commutation troubles. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
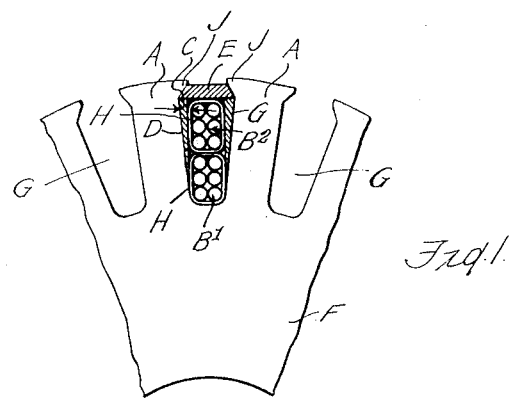
Figure 2:
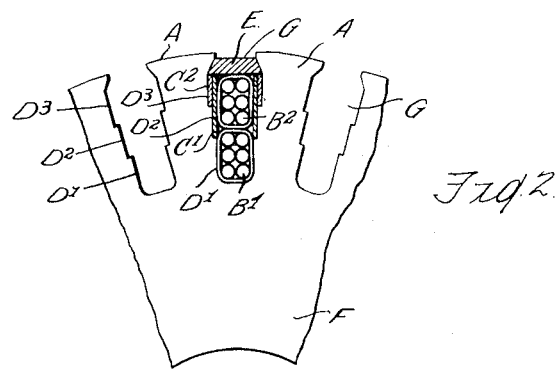
Figure 3:
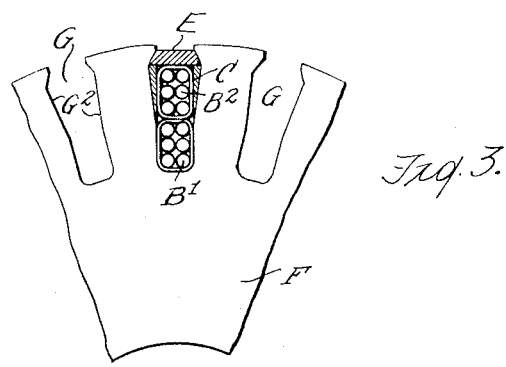

In the accompanying drawing in which are shown several of the various possible embodiments of my invention, Figure 1 is a fragmentary end view of an armature core showing in section the winding and insulation construction within one slot, Figure 2 is a partial end view of a modified form of slot and insulation construction, and Figure 3 is a partial end view of another modification of insulation and slot construction.

Similar reference characters refer to similar parts throughout the several views in the drawing.

As conducive to a clearer understanding of certain features of my invention, it may at this point be noted that in the design, construction and operation of a direct current motor or generator for operation at widely varying speeds and widely varying load conditions, special precautions must be taken to insure satisfactory commutation and to achieve particularly a smooth-running machine in which sparking at the commutator with its attendant heating, pitting and danger of direct flow-over is reduced to a minimum. One of the dominant aims of my invention is to obtain good commutation in a simple, direct, effective and inexpensive manner with a minimum amount of attention despite widely varying speeds of operation of the machine and despite large fluctuations in load.

Referring now to the drawing and more particularly to Figure 1 thereof, there is shown at F a portion of an armature core comprising the tooth sections A and the intervening slot sections G. To simplify the drawing only one slot is shown as filled with a portion of the armature winding and the necessary insulation. The lower portion of the central slot G is filled with the coil side $B^1$ of a coil which may lay off to the left while the upper portion of the slot is filled with the coil side $B^2$ of a coil which may lay off to the right of the section shown. For purposes of illustration I have shown each coil as comprising six conductors, two in width and three in depth and I have shown two coil sides per slot.

The coil sides $B^1$ and $B^2$ are insulated from each other and partially insulated from the armature core by the tape insulation H which has been wound about the conductors comprising the coil. The space between the coil sides $B^1$ and $B^2$ and the adjacent teeth A—A is preferably filled with a slot insulating material which is formed to give a tight fit between the slot walls D and the insulation H of the coil sides. A rigid winding construction within the armature slots is assured by the insulating top stick E which interfits with or under the overhanging upper tooth portions J and securely presses against the coil sides $B^1$ and $B^2$ as well as the slot insulation material C.

It is to be noted that with my construction the width of the slot G increases in going from the base toward the top. It is also to be noted that the distance between the coil sides $B^1$ and $B^2$ and the walls D of the adjacent slots A—A also increases in going from the lower toward the outermost portions of the slot. It is to be further noted that while the slot width increases in going from the inner toward the outer portions of the armature core, the armature teeth are preferably maintained substantially consistent in width. With my armature construction not only is the armature leakage reactance increased but the reluctance of the magnetic path of the cross field of the coil undergoing commutation is substantially increased, hence for a constant magnetomotive force due to the armature current flowing in the coil undergoing commutation, the total flux is materially reduced. The magnetic path for the cross field component of the total flux may be traced as follows:

Starting at the center of the coil undergoing commutation, the flux passes with its lines of force perpendicular to the plane of the coil. The flux then spreads outwardly from the center then curves and passes along the air gap pole faces and armature surface to the other side of the coil where it curves and returns through the armature teeth and slot portions of the core until the coil center has again been reached. While the path of the most central lines of force emerges along the length of the armature teeth, those lines which are more nearly adjacent the coil sides pass through the teeth in a more nearly transverse direction and for the coil side which is at the top of the slot, the path of the adjacent flux passing within it is largely confined, while in the core section, to passing from tooth to tooth across the slots between teeth. In the case of the coil side which is located at the base of a slot, the return flux to a large extent passes outside of the coil from tooth to tooth across the intervening slotted portions along the outermost portions of the armature core. To reduce the magnitude of this cross field and thus to improve commutation, the reluctance of this magnetic path has been increased by increasing its length through air and reducing its length through iron. The length of the magnetic path is increased by widening the slots in the manner shown in going from the innermost to the outermost portions of the armature core or from the base to the top of the slots. This widening of slots is preferably carried only to a point where further widening would unduly restrict the magnetic path along the length of the teeth for the main magnetic field component.

In Figure 2 there is shown a modified form of armature tooth and slot construction. The lower and upper coil sides respectively denoted $B^1$ and $B^2$ are located within the central slot G and insulated from the tooth walls D by means of insulating strips $C^1$ and $C^2$. The coil sides with their insulating material are securely fastened within the slots by the top stick E. The sides of teeth A—A which form the walls of slots G are stepped as for example, at $D^1$, $D^2$ and $D^3$, thus giving a stepped increase in width of slot in progressing from the base portion to the top portion and also giving a stepped space between the slot walls and the coil sides. With this construction regularly dimensioned strips of insulation for example strips $C^1$ and $C^2$, are inserted between the slot walls and the coil sides. As previously indicated, the insulation between the lower coil side and the armature core is obtained, for example, by means of the layer of tape insulation directly wound on the coils prior to their assembly in the armature core. Also insulation between coil sides is effected by means of the tape insulation used on the coils prior to their assembly.

In Figure 3 there is shown another modification of my armature slot and tooth construction in which the armature core F is slotted at G—G to give straight substantially parallel lower wall portions $G^1$ between which is received a coil side $B^1$ and upper slanting wall portions $G^2$ between which is received a coil side $B^2$. With this construction, the additional insulation material C is wedge-like in section and need only extend along the upper slanting wall portions $G^2$ of the slots and between the latter and the coil side $B^2$. As in the previous embodiments, a compact and rigid winding construction within the slots is assured by the top stick E.

The action of the arrangements of Figures 2 and 3 will now be clear in view of the detailed description of certain features of action in connection with the construction of Figure 1.

Thus it is to be seen that there has been provided in this invention an armature slot and winding construction in which the various objects hereinbefore noted together with many thoroughly practical advantages, are successfully achieved.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a dynamo electric machine wherein a rotatable armature core with its associated commutator is rotated at a variable speed in a suitable magnetic field, the combination with said armature core of windings on said core and means for reducing the effect of cross-flux produced by said armature windings and hence for reducing commutator sparking, said means including slots in said core extending in a general radial direction for receiving therein said windings, and said windings being of uniform thickness, the distance between the uniformly thick armature windings within a slot and the walls of the slot increasing in a direction from the base of the slot toward the periphery of said armature core whereby the reluctance of the magnetic path of said cross-flux is proportionally greater and the cross-flux correspondingly more reduced as the outermost end of the armature slot is approached.

2. In a dynamo electric machine wherein a rotatable armature core with its associated commutator is rotated at a variable speed in a suitable magnetic field, the combination with said armature core of windings on said core and means for reducing the effect of cross-flux produced by said armature windings and hence for reducing commutator sparking, said means including slots in said core extending in a general radial direction for receiving therein said windings, said windings being of uniform thickness and the walls of the slots within which the uniformly thick windings are received are stepped away from the windings in a plurality of successive steps in a direction from the base of the slots toward the periphery of the armature core whereby the effective width of the slots and the reluctance presented thereby to said cross-flux progressively increases in said direction.

3. In a dynamo electric machine wherein a rotatable armature core with its associated commutator is rotated at a variable speed in a suitable magnetic field, the combination with said armature core of windings on said core and means for reducing the effect of cross-flux produced by said armature windings and hence for reducing commutator sparking, said means including slots in said core extending in a general radial direction for receiving therein said windings, said slots being of increasing width in a direction from the base of the slots toward the periphery of the armature core and leaving between any two successive slots a core tooth of substantially uniform width whereby the reluctance of the magnetic circuit of which the core teeth form a part and which is traversed by the flux from said field is substantially unaffected while the reluctance of the path through which said cross-flux produced by said windings is increased and the cross-flux diminished.

HUGO GROB.